2,806,002

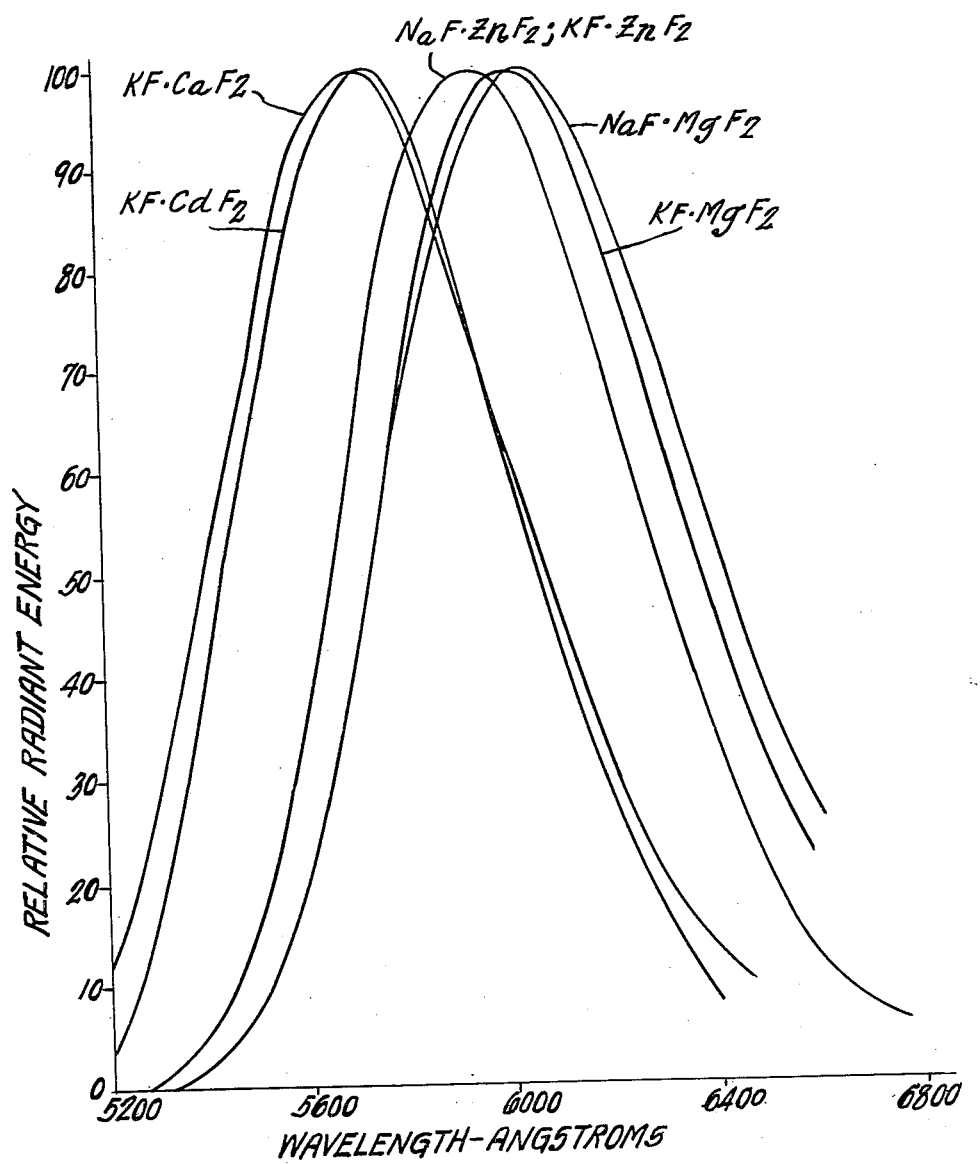

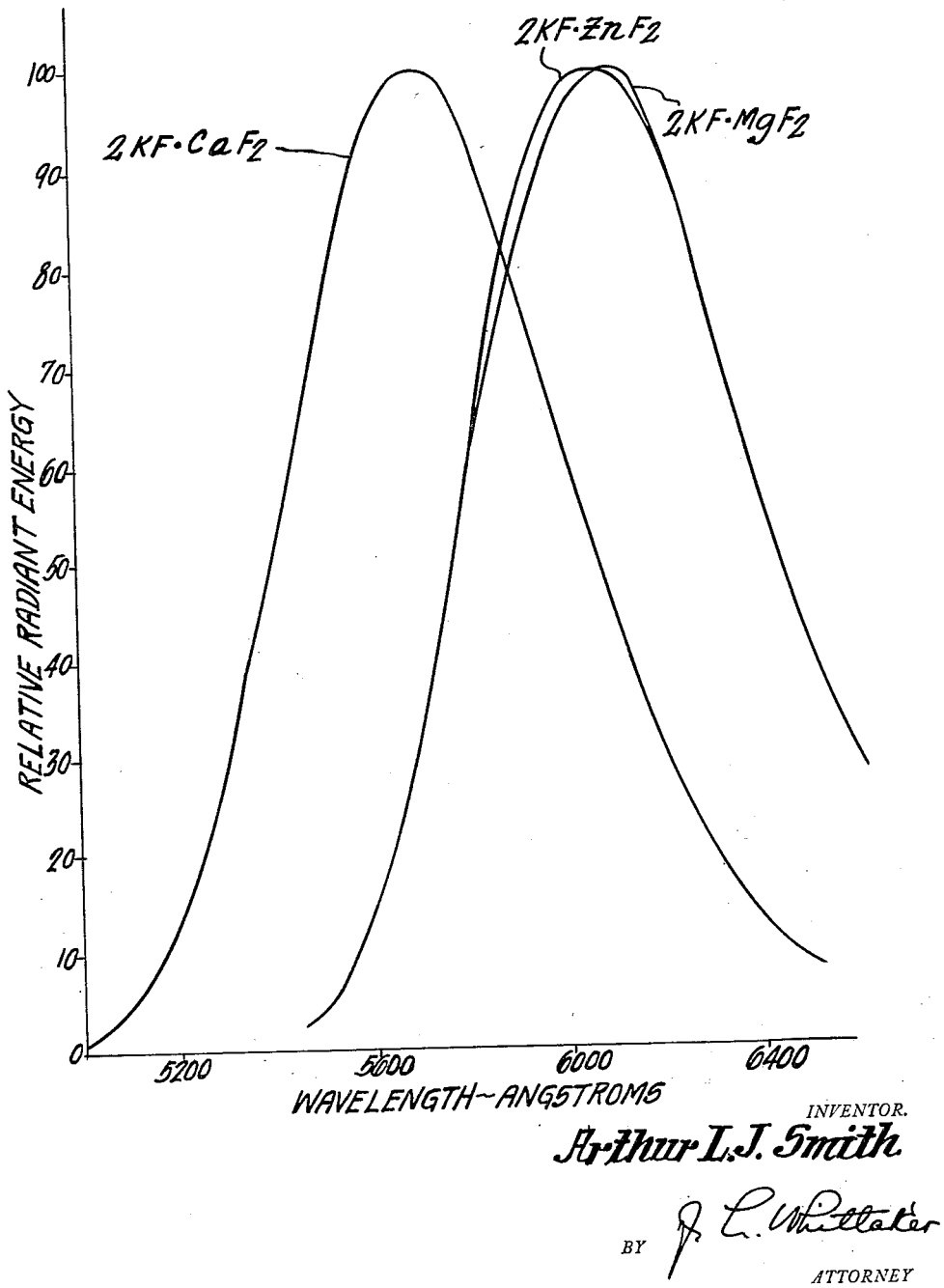

FLUORIDE PHOSPHORS

Arthur L. J. Smith, Lancaster, Pa., assignor to Radio Corporation of America, a corporation of Delaware Application April 28, 1953, Serial No. 351,596

7 Claims. (Cl. 252—301.6)

This invention relates to improved phosphor materials and to improvements in the method of making the materials. More particularly, the invention relates to improved fluoride phosphors and to improved methods of preparation of these fluorides.

Many types of phosphors have been proposed for use in cathode ray tubes and luminescent lamps, the principal requirement being high fluorescent efficiency under electronic, ionic or radiant energy excitation. Desirable spectral distribution of luminescence is also an important requirement for phosphors used in this type of apparatus. Aircraft position and indicating equipment, utilizes cathode ray tubes in which the luminescent screens are composed of phosphors having relatively long decay periods as well as suitable luminescence intensity. In this type of equipment, it is required, for example, to trace the trajectory of an approaching aircraft on the screen of a cathode ray tube and have this trajectory visible as a phosphorescing trace for a relatively long period of time. In such radar systems, the beam of the cathode ray tube is sequentially pulsed to form on the screen a phosphorescent light trace representing the trajectory of the aircraft.

In radar applications, it is desirable that a phosphor material have a decay characteristic of light output versus time which is exponential in form. A material which has an exponential decay characteristic is more amenable to mathematical analysis than other types of material, e. g. those having a hyperbolic decay curve. Furthermore, a phosphor material which has an exponential decay characteristic retains a comparatively high level of output for a comparatively long time and then the light output decays rather rapidly. Such a characteristic is desirable for radar applications.

Accordingly, an object of this invention is to provide a novel luminescent material which will emit light of high intensity under cathode ray bombardment.

Another object is to provide a new luminescent material of which the spectral emission and persistence of emission may be varied over a range by varying one or more components of the material.

Another object is to provide an improved phosphor having an exponential decay characteristic.

In general, the invention lies in the preparation of an improved phosphor comprising a manganese activated combination of fluorides selected from the group consisting of sodium, potassium, and rubidium with fluorides selected from the group consisting of calcium, cadmium, zinc and magnesium with the exception of the sodium-cadmium and sodium-calcium combinations. Manganese is present in activator proportions.

The invention is described with reference to the drawing wherein:

Fig. 1 is a family of graphs illustrative of the luminescence v. wavelength characteristics of certain embodiments of the invention; and, Fig. 2 is a family of graphs illustrative of the luminescence v. wavelength characteristics of other embodiments of the invention.

The preparation of a potassium zinc fluoride phosphor in accordance with the present invention having the composition $KF.ZnF_2:Mn$ is preferably accomplished as follows: One mole of anhydrous potassium fluoride, one mole of anhydrous zinc fluoride and 0.02 mole of manganous fluoride are mixed in the dry state and ground to a fine powder in preparation for firing. The firing step is accomplished in a neutral or reducing atmosphere at a temperature of 800° C. The preferred procedure comprises firing the sample first for one-half hour, re-grinding the fired material and then firing for another hour. Such a procedure facilitates the reaction of the substances involved and provides a higher quality and more homogeneous end product. This procedure also has the advantage of being fast and not particularly critical. To insure against oxidation during firing, the sample is fired in a double container. An inner container or crucible holding the sample may be made of platinum and is provided with a platinum lid. The outer container is preferably made of quartz and is provided with a tight-fitting lid. Carbon is generally placed in the outer container to further insure against oxidation of the sample.

The product resulting from the above-described process is a homogeneous, fine-particle, soft powder which has a yellow emission with a peak at 5920 Angstroms. Such a phosphor is particularly suitable for use in electron devices employed in radar or similar systems.

Although the foregoing method for preparing $$KF.ZnF_2:Mn$$

is the preferred method, variations in some of the steps are possible. For example, the firing temperature of the mixed sample may be within the range of 700° C. to 1000° C. and the firing may be accomplished in a single step lasting from approximately 20 minutes to approximately 12 hours, with the shorter times accompanying the higher temperatures.

Other methods of providing a non-oxidizing atmosphere may be used. For example, firing may take place with the crucibles surrounded by an inert gas or a slightly reducing gas. In addition, carbon crucibles may be employed to hold the sample during firing.

The series of phosphors within the scope of this invention may be represented by the following general formula:

$$xM'F.yM''F_2:zMn$$

In this formula, the notations are as follows: M' is an alkali metal of the group consisting of Na, K, Rb; M'' is a divalent metal of the group consisting of Mg, Ca, Zn, Cd; the sodium-cadmium and sodium-calcium combinations are excluded; Mn may be present as a fluoride, chloride, sulfate or as any other suitable salt with $MnF_2$ the preferred activator; $x=y$ for all combinations of M' and M'' and, in the case of potassium as M', $x$ may also equal $2y$; and, for one mole of phosphor, $z$ may have values in the range of 0.001 to 0.1 mole, preferably 0.02 mole.

In accordance with the general formula, if one mole of sodium fluoride is utilized as the M' material, instead of potassium, with one mole of zinc fluoride as the M'' material, the color of the emission is substantially the same as for the potassium-containing phosphor. The preferred firing temperature in this instance is 950° C.

In the case of phosphors having potassium as the M' component, a series of phosphors may be prepared in which the ratio of potassium to M'' material is two to one. For example, if two moles of potassium fluoride are used as the M' material with zinc fluoride as the M'' material, the resulting phosphor has a peak emission at 6070 Angstroms which represents a shift toward the green.

In accordance with the foregoing formula, the divalent ion M'' may also be varied. For example, any one of Zn, Mg, Ca, Cd may be employed, except for the Na-Cd and Na-Ca combinations which are excluded. Substituting magnesium in place of zinc with sodium as the M' component provides a phosphor having considerably longer decay time and having the peak emission shifted toward the red. The peak emission for sodium magnesium fluoride is 6080 Angstroms. The peak emission for potassium magnesium fluoride is 6000 Angstroms. Calcium with potassium fluoride forms a phosphor having peak emission at 5710 Angstroms. Cadmium as the M" ion prepared with both one and two moles of potassium fluoride provides a phosphor having peak emission at 5720 Angstroms.

Typical emission curves for various phosphor samples are shown in Figures 1 and 2.

A further modification of the invention comprises utilizing one or two M' materials and one or two M" materials in the mixed ground sample and, in the extreme, the M' component may include all of the M' materials listed above and the M" component may also include all of the pertinent divalent materials listed above. By such variation in the number of substances used, a variety of emission colors and decay times may be obtained. In this modification of the invention, the M' and M" materials constituting the sample to be fired must have the molar ratios set forth above. Examples of suitable complex samples are as follows:

$$(0.5Na+0.5K)F(0.5Zn+0.5Mg)F_2:0.02MnF_2$$
$$(0.5Na+0.5Rb)F.ZnF_2:0.02MnF_2$$

The firing temperatures for the foregoing variations in M' and M" constituents are substantially the same and again fall within the range of about 700° C. to about 1000° C. The general rule which may be followed in determining firing time for each sample is that if the melting point of the sample compound is above 1000° C., firing may be carried out at 950° C. If the melting point is below 1000° C., the firing temperature may be established 50° below the melting point. Some typical phosphors prepared according to the invention and their peak emissions are as follows:

| Phosphor: | Peak emission (Angstroms) |
|---|---|
| $NaFMgF_2$ | 6080 |
| $NaFZnF_2$ | 5920 |
| $KFMgF_2$ | 6000 |
| $KFZnF_2$ | 5920 |
| $KFCaF_2$ | 5710 |
| $KFCdF_2$ | 5720 |
| $2KFMgF_2$ | 6100 |
| $2KFZnF_2$ | 6070 |
| $2KFCaF_2$ | 5710 |
| $2KFCdF_2$ | 5720 |

An alternative method of preparing the phosphors according to the invention comprises mixing the carbonates, oxides or hydroxides of the selected M' and M" materials in the proper ratios desired in the final phosphor with the requisite amount of manganese activator. The mixture is slurried with water to form a thin paste. One member of the group consisting of hydrofluoric acid, ammonium fluoride and ammonium bifluoride is added to the paste in slight excess of the amount required to convert the M' and M" salts to fluorides. The mixture is then carefully evaporated to dryness at a temperature in the range of 110° C. to 150° C. The dried material is then heated in a non-oxidizing atmosphere at 500° C. to dispel any of the hydrofluoric acid, ammonium fluoride or ammonium bifluoride present. The material is then ground and fired according to the foregoing method to prepare the final phosphor.

What is claimed is:

1. A crystalline luminescent material represented by the general formula:

$$x(M'F)y(M''F_2):zMn$$

wherein M' is a metal selected from the group consisting of sodium, potassium and rubidium; M" is a metal selected from the group consisting of magnesium, calcium, zinc, and cadmium with the combinations of sodium and cadmium and sodium and calcium excluded and $x=y$ for all substances except potassium in which case $x$ may also equal $2y$ and $z=0.001$ to $0.1$ per mole of host crystal.

2. A crystalline luminescent material represented by the general formula:

$$x(M'F)y(M''F):zMn$$

wherein M' is at least one element selected from the group consisting of sodium, potassium, and rubidium, M" is at least one element selected from the group consisting of magnesium, calcium, zinc, and cadmium excluding the combinations of sodium and cadmium and sodium and calcium, and $x=y$ for all elements except potassium in which case $x$ may also equal $2y$, and $z=0.001$ to $0.1$ mole per mole of host crystal.

3. A luminescent material comprising a manganese activated fluoride in which the fluoride matrix thereof has the molar formula:

$$x(M'F)yM''F$$

wherein: M' is at least one element selected from the group consisting of sodium, potassium, and rubidium, M" is at least one element selected from the group consisting of magnesium, calcium, zinc, and cadmium, excluding the combinations of sodium and calcium and sodium and cadmium and $x=y$ for all elements except potassium in which case $x$ may also equal $zy$.

4. A luminescent material comprising a manganese activated sodium zinc fluoride having the formula $$NaF.ZnF_2:.02Mn$$

5. A luminescent material comprising a manganese activated potassium zinc fluoride having the formula $KF.ZnF_2:.02Mn$.

6. A method of preparing a phosphor which comprises a manganese activated fluoride of M' and M" wherein M' may be an element of the group consisting of Na, K, and Rb and M" may be an element of the group consisting of Mg, Ca, Cd, and Zn except that the Na-Ca, Na-Cd combinations are excluded, comprising the steps of mixing in the proportions of $x$ moles of M' as a first constituent comprising one member of the group consisting of M' carbonate, M' oxide and M' hydroxide with $y$ moles of M" as a second constituent comprising one member of the group consisting of M" carbonate, M" oxide, and M" hydroxide with $z$ moles of Mn activator and with water to form a thin paste wherein $x=y$ for all elements except K in which case $x$ may also equal $2y$ and $z=0.001$ to $0.1$ per mole of host crystal; adding a third constituent to said paste selected from the group consisting of hydrofluoric acid, ammonium fluoride, and ammonium bifluoride in an amount in excess of that required to convert the M' and M" salts to fluorides; drying said mixture of constituents at a temperature in the range of 110° C. to 150° C.; heating said mixture at 500° C. in a non-oxidizing atmosphere to dispel any of said third constituent present; grinding said mixture; and heating said mixture in a non-oxidizing atmosphere at a temperature in the range of 700° C. to 1000° C. for about one hour.

7. A luminescent material consisting essentially of a manganese activated potassium magnesium fluoride phosphor in which the fluoride matrix thereof has the formula $2KF.MgF_2$.

References Cited in the file of this patent

UNITED STATES PATENTS

| 2,435,435 | Fonda | Feb. 3, 1948 |

FOREIGN PATENTS

| 579,749 | Great Britain | Aug. 14, 1946 |